(12) United States Patent
O'Connell et al.

(10) Patent No.: US 7,797,141 B2
(45) Date of Patent: Sep. 14, 2010

(54) PREDICTIVE ANALYSIS OF AVAILABILITY OF SYSTEMS AND/OR SYSTEM COMPONENTS

(75) Inventors: Don M. O'Connell, Renton, WA (US); David C. Nelson, Edmonds, WA (US)

(73) Assignee: The Boeing Company, Chicago, IL (US)

(*) Notice: Subject to any disclaimer, the term of this patent is extended or adjusted under 35 U.S.C. 154(b) by 583 days.

(21) Appl. No.: 11/304,925

(22) Filed: Dec. 15, 2005

(65) Prior Publication Data

US 2006/0095247 A1 May 4, 2006

Related U.S. Application Data

(63) Continuation-in-part of application No. 11/124,947, filed on May 9, 2005, which is a continuation-in-part of application No. 10/277,455, filed on Oct. 22, 2002, now Pat. No. 7,506,302.

(51) Int. Cl.
 G06G 7/48 (2006.01)
(52) U.S. Cl. .............................. 703/6; 703/13; 702/186
(58) Field of Classification Search ................. 703/6, 703/21, 22; 702/182, 183, 184, 185, 186
See application file for complete search history.

(56) References Cited

U.S. PATENT DOCUMENTS

| 5,276,877 A | 1/1994 | Friedrich et al. |
| 5,594,792 A | 1/1997 | Chouraki et al. |
| 5,822,531 A * | 10/1998 | Gorczyca et al. ............ 709/221 |
| 5,881,268 A | 3/1999 | McDonald et al. |
| 5,881,270 A * | 3/1999 | Worthington et al. ......... 703/21 |
| 5,978,576 A | 11/1999 | Sanadidi et al. |
| 2002/0002448 A1* | 1/2002 | Kampe ........................ 703/22 |
| 2002/0049571 A1* | 4/2002 | Verma et al. .................... 703/1 |
| 2002/0161566 A1 | 10/2002 | Uysal et al. |
| 2003/0034995 A1* | 2/2003 | Osborn et al. ............... 345/713 |
| 2003/0139918 A1 | 7/2003 | Hardwick et al. |
| 2003/0176931 A1 | 9/2003 | Pednault et al. |
| 2003/0177018 A1 | 9/2003 | Hughes |
| 2004/0034857 A1 | 2/2004 | Mangino et al. |

OTHER PUBLICATIONS

Michel Baudin et al., "From Spreadsheets to Simulations: A Comparison of Analysis Methods for IC Manufacturing Performance", 1992, IEEE, pp. 94-99.*

Flaviu Cristian, "Understanding Fault-Tolerant Distributed Systems", 1991, Communications of the ACM, vol. 34, No. 2, pp. 56-78.*

(Continued)

*Primary Examiner*—Jason Proctor
(74) *Attorney, Agent, or Firm*—Harness, Dickey & Pierce, P.L.C.

(57) ABSTRACT

A method of modeling a mission system. The system is represented as a plurality of architectural components. At least some of the architectural components are configured with availability characteristics to obtain a model of the system. The model is implemented to assess availability in the mission system. The model may be implemented to perform tradeoff decisions for each individual component and interrelated components. Availability can be assessed for the system, given all of the tradeoffs.

15 Claims, 13 Drawing Sheets

OTHER PUBLICATIONS

Allen M. Johnson, Jr. et al., "Survey of Software Tools for Evaluating Reliability, Availability, and Serviceability", 1988, ACM Computing Surveys, vol. 20, No. 4, pp. 227-269.*

Arne Thesen et al., "Introduction to Simulation," 1990, Proceedings of the 1990 Winter Simulation Conference, pp. 14-21.*

C. Singh et al., "A Simulation Model for Reliability Evaluation of Space Station Power Systems," 1989, IEEE, pp. 39-42.*

Bahrami, A. et al., Enterprise Architecture For Business Process Simulation, Winter Simulation Proceeding (Washington, DC, Dec. 13-16, 1998), 2:1409-1413.

Butler, K., UML Requirements for Designing Usable and Useful Applications: Position Paper for the 2nd SIGCHI Workshop on OO Modeling for UI Design, 1-23 http://www.primaryview.org/CHI98/PositionPapers/KeithB.htm.

* cited by examiner

| Namd | Extend Row | PDSource | PDDest | PNeeds | Dest2 | Dest3 | ILoads | MSGType |
|---|---|---|---|---|---|---|---|---|
| SRouter1-droute0, KUL | 1 | 1 | 1 | 8 | 1 | | | 1 |

464

| Process, componentType | on/off | available | required | timeV1 | timeV2 | distType | failure Type | coldstart time | restart time | switchover time | isolation time | cumulative Availability |
|---|---|---|---|---|---|---|---|---|---|---|---|---|
| collect-sensors, hold0 | 1 | 1 | | | | | | 100 | 50000 | 6 | | 10 |

468

| Process, componentType | on/off | required | heartbeat failure Time | heartbeat receive Time | heartbeat Failed | freeform |
|---|---|---|---|---|---|---|
| collect-sensors, hold0 | 1 | | | | | |

472

| Process, componentType | on/off | component message type |
|---|---|---|
| collect-sensors, hold0 | 1 | |

476

| Process, componentType | on/off | redundant With | redundant With | redundant With | redundant With | more Redundancy |
|---|---|---|---|---|---|---|
| collect-sensors, hold0 | 1 | | | | | |

480

| Process, componentType | on/off | redundant With | redundant With | redundant With | redundant With | more Redundancy |
|---|---|---|---|---|---|---|
| collect-sensors, hold0 | 1 | | | | | |

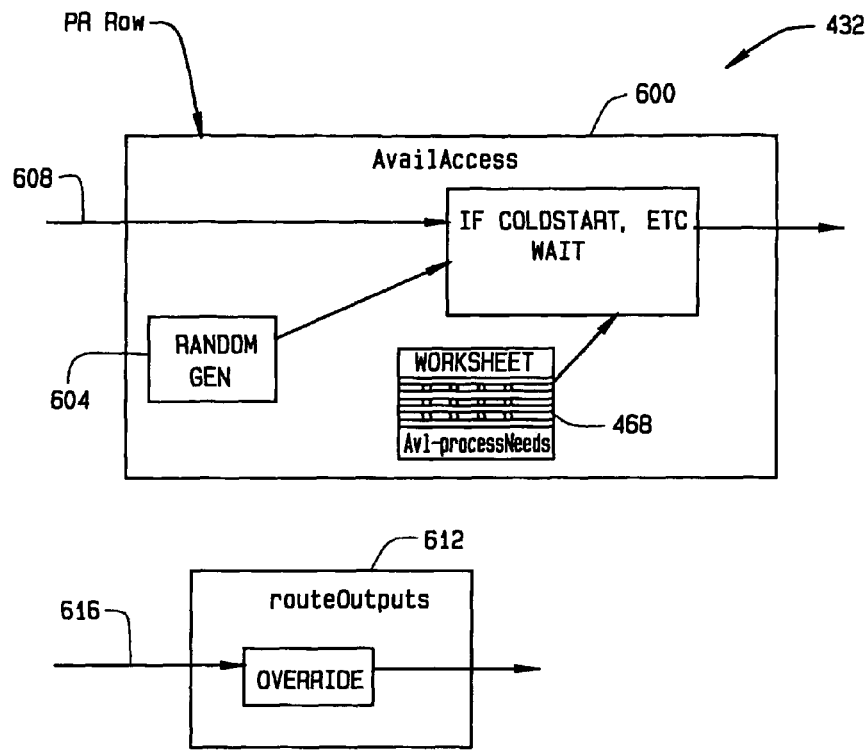
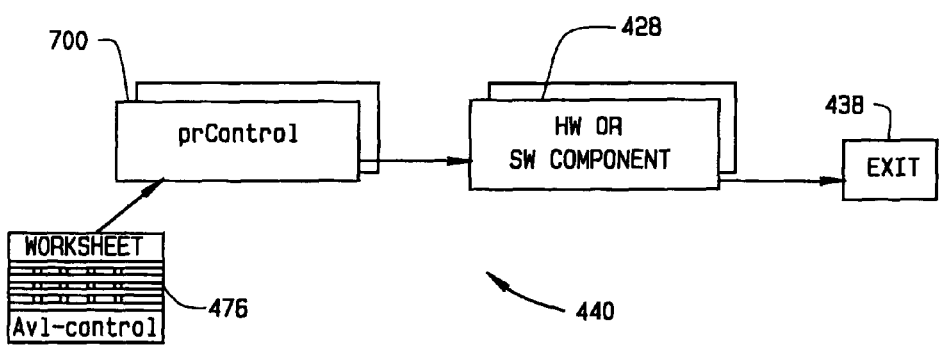
FIG. 11
FIG. 12

PREDICTIVE ANALYSIS OF AVAILABILITY OF SYSTEMS AND/OR SYSTEM COMPONENTS

CROSS-REFERENCE TO RELATED APPLICATIONS

This application is a continuation-in-part of U.S. patent application Ser. No. 11/124,947 filed on May 9, 2005, which is a continuation in part of U.S. patent application Ser. No. 10/277,455 filed on Oct. 22, 2002. The disclosures of the foregoing applications are incorporated herein by reference.

FIELD

The present disclosure relates generally to the modeling of systems and more particularly (but not exclusively) to modeling and analysis of availability in systems.

BACKGROUND

Mission systems typically include hardware components (e.g., computers, network components, sensors, storage and communications components) and numerous embedded software components. Historically, availability prediction for large mission systems has been essentially an educated mix of (a) hardware failure predictions based on well-understood hardware failure rates and (b) software failure predictions based on empirical, historical or "gut feel" data that generally has little or no solid analytical foundation or basis. Accordingly, in availability predictions typical for large-scale mission systems, heavy weighting frequently has been placed upon the more facts-based and better-understood hardware failure predictions while less weighting has been placed on the more speculative software failure predictions. In many cases, mission availability predictions have consisted solely of hardware availability predictions. Hardware, however, is becoming more stable over time, while requirements and expectations for software are becoming more complex.

SUMMARY

The present disclosure, in one aspect, is directed to a method of modeling a mission system. The system is represented as a plurality of architectural components. At least some of the architectural components are configured with availability characteristics to obtain a model of the system. The model is implemented to assess availability in the mission system.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 9 is a diagram of spreadsheet inputs according to some implementations of the disclosure;

FIG. 11 is a diagram of availability analysis subcomponents of a software architectural component according to some implementations of the disclosure;

FIG. 12 is a diagram of system management control components according to some implementations of the disclosure;

DETAILED DESCRIPTION

Figure 1:
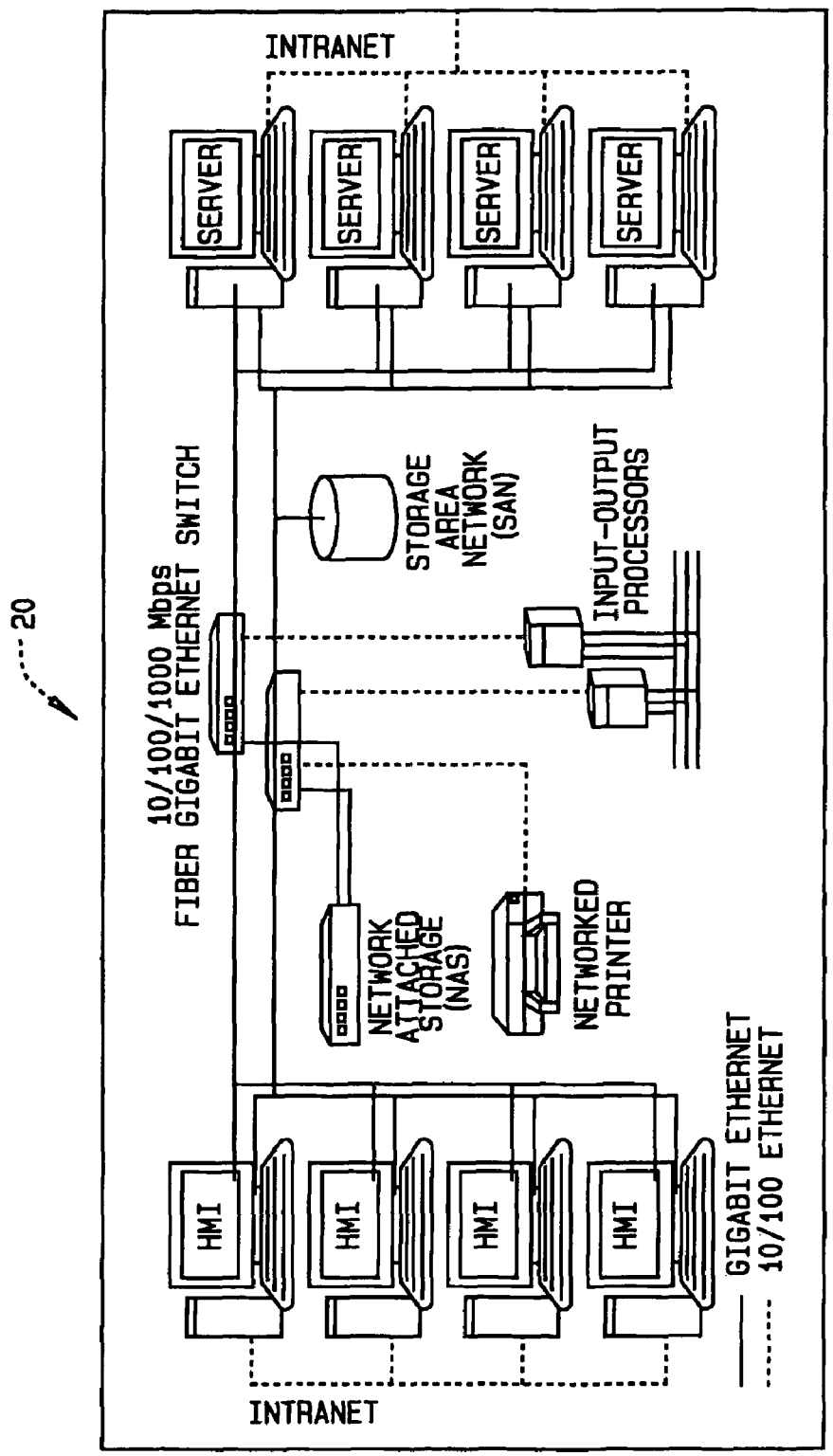
FIG. 1 is a block diagram of a system that can be modeled according to some implementations of the disclosure.

The following description is merely exemplary in nature and is not intended to limit the present disclosure, application, or uses. It should be understood that throughout the drawings, corresponding reference numerals indicate like or corresponding parts and features.

In various implementations of a method of modeling a mission system, a plurality of components of generic structure (COGSs) are used to represent the mission system as a plurality of architectural components. The architectural components may include, for example, networks, switches, computer nodes, backplanes, busses, antennas, software components residing in any of the foregoing components, satellite transponders, and/or receivers/transmitters. The COGSs are configured with availability characteristics to obtain a model of the system. The model may be implemented to assess availability in the mission system. The model may be used to analyze reliability in the mission system as well as reliability of hardware, network and/or software components of the system.

Component-based modeling environments in accordance with the present disclosure can provide for modeling of system hardware and software architecture to generate predictive analysis data. An exemplary system architecture that can be modeled in accordance with one implementation is indicated generally in FIG. 1 by reference number 20. The system 20 may be modeled using COGSs in combination with a COTS tool to allow modeling of specific attributes of the system.

Figure 2:
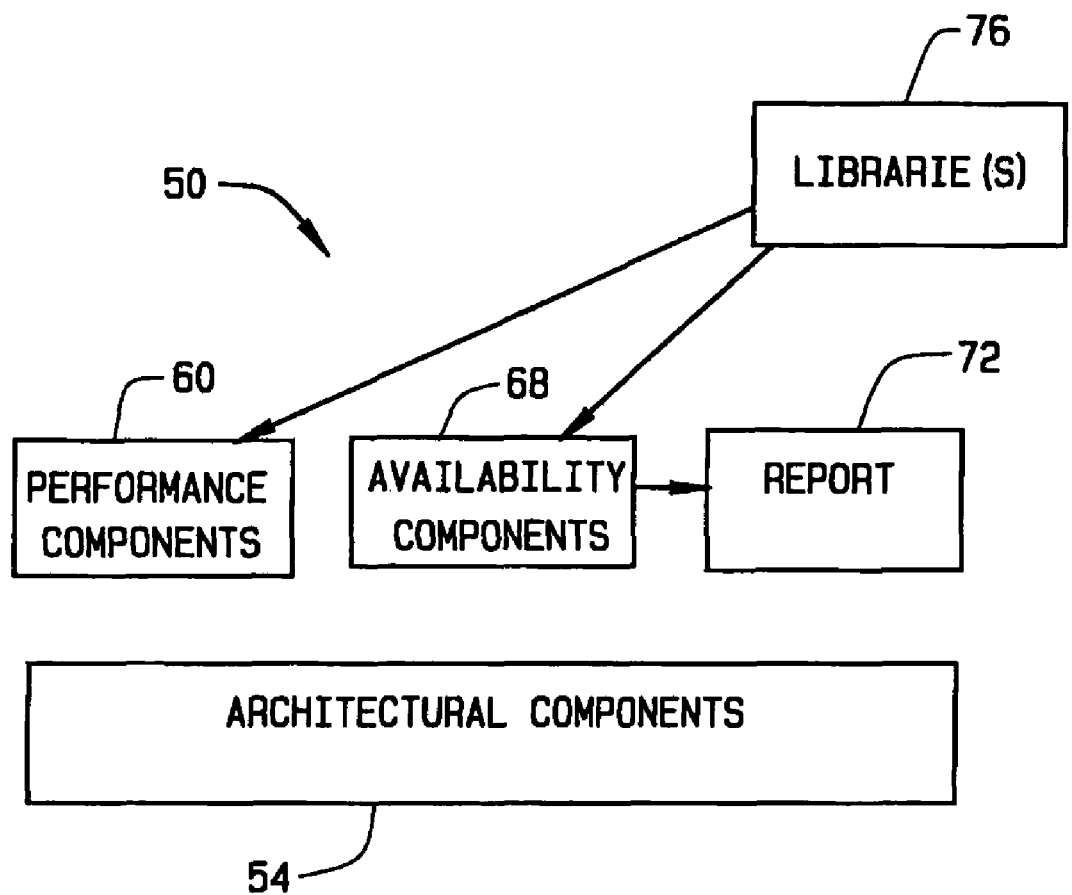
FIG. 2 is a block diagram of a system architecture representation according to some implementations of the disclosure.

A build view of a system architecture in accordance with one implementation is indicated generally in FIG. 2 by reference number 50. The architecture 50 includes a plurality of architectural components 54, a plurality of performance components 60, and a plurality of availability components 68. The availability components 68 may be used to generate one or more reports 72. One or more libraries 76 may include configuration research libraries that allow individual component research to be input to modeling. Libraries 76 also may optionally be used to provide platform-routable components for modeling system controls, overrides, queues, reports, performance, discrete events, and availability. Such components can be routed and controlled using a platform routing spreadsheet as further described below.

The architectural components 54 include components of generic structure (COGs). COGSs are described in co-pending U.S. patent application Ser. No. 11/124,947, entitled "Integrated System-Of-Systems Modeling Environment and Related Methods", filed May 9, 2005, the disclosure of which is incorporated herein by reference. As described in the foregoing application, reusable, configurable COGSs may be combined with a commercial off-the-shelf (COTS) tool such as Extend™ to model architecture performance.

The COGSs 54 are used to represent generic system elements. Thus a COGS 54 may represent, for example, a resource (e.g., a CPU, LAN, server, HMI or storage device), a resource scheduler, a subsystem process, a transport component such as a bus or network, or an I/O channel sensor or other I/O device. It should be noted that the foregoing system elements are exemplary only, and other or additional hardware, software and/or network components and/or subcomponents could be represented using COGSs.

The performance components 60 include library components that may be used to configure the COGSs 54 for performance of predictive performance analysis as described in U.S. application Ser. No. 11/124,947. The availability components 68 include library components that may be used to configure the COGSs 54 for performance of predictive availability analysis as further described below. In the present exemplary configuration, inputs to COGSs 54 include spreadsheet inputs to Extend™ which, for example, can be modified at modeling runtime. The COGSs 54 are library components that may be programmed to associate with appropriate spreadsheets based on row number. Exemplary spreadsheet inputs are shown in Table 1. The inputs shown in Table 1 may be used, for example, in performing predictive performance analysis as described in U.S. application Ser. No. 11/124,947. The spreadsheets in Table 1 also may include additional fields and/or uses not described in Table 1. Other or additional spreadsheet inputs also could be used in performing predictive performance analysis. In implementations in which another COTS tool is used, inputs to the COGSs 54 may be in a form different from the present exemplary Extend™ input spreadsheets.

TABLE 1

| Spreadsheet | Use | |
|---|---|---|
| PlatformRouting | Allows routing of most messages to change without changing the model, only this spread sheet. Associates work sheets with process and IOSensor blocks. | Primarily used in processes and I/OSensors. |
| resourceCap | Includes list of resources, with capacities. E.g., includes MIPS strength of a CPU on a node, or kb/sec capacity of a LAN, SAN or NAS. Field list includes resource name, number of resources, capacity units and comments. Process programming is facilitated where an exceedRow is the same as a resource node column. | In hardware models, e.g., server nodes, HMI nodes, disks and transport LAN strength. |
| processDepl | Includes the mapping of processes to resources. E.g., a track-ident process can be mapped onto a server node. Field list includes process name, node it is deployed on, process number, ms between cycles and comments. | Process models and transport. |
| processNeeds | Includes an amount of resource that a process/thread needs to complete its task. This can be done on a per record basis, or a per task basis. It can be applied to CPU, LAN or storage resources. E.g., it can state that a track-id process needs 0.01 MIPS per report to perform id. Field list includes process/thread name, MIPS needs, on/off and ms between cycles and comments. | Process models. |
| msgTypes | Used to describe additional processing and routing to be done by processes upon receipt of messages. | Process models. |

Figure 3:
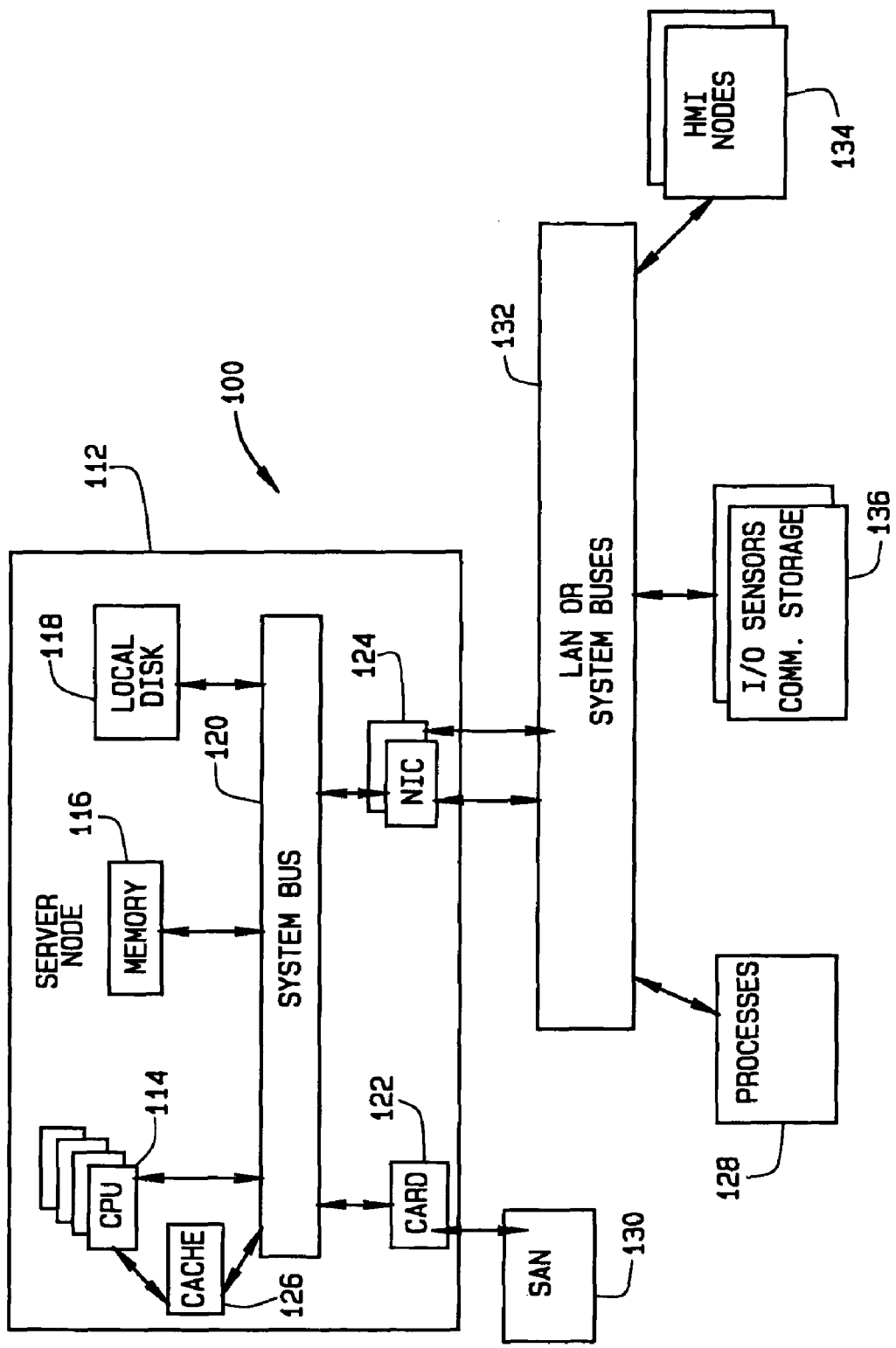
FIG. 3 is a block diagram illustrating how a server node may be modeled as a component of generic structure according to some implementations of the disclosure.

Several exemplary COGSs 54 shall now be described with reference to various aspects of predictive performance analysis as described in U.S. application Ser. No. 11/124,947. A block diagram illustrating how an exemplary server node may be modeled as a COGS is indicated generally in FIG. 3 by reference number 100. In the present example, a server node COGS 112 is modeled as having a plurality of CPUs 114, a memory 116, a local disk 118, a system bus 120, a SAN card 122, a plurality of network interface cards (NICs) 124 and a cache 126. The CPU(s) 114 are used by processes 128 based, e.g., on messages, rates and MIPS loading. Cache hit rate and cache miss cost may be modeled when a process 128 runs. Cache hit rate and cache miss cost may be input by the spreadsheet resourceCap. Also modeled is usage of the system bus 120 when cache hit or miss occurs. System bus usage, e.g., in terms of bytes transferred, also is modeled when a SAN 130 is accessed. SAN usage is modeled based on total bytes transferred. System bus usage, e.g., in terms of bytes transferred, is modeled when data travels to or from the server node 112 to an external LAN 132 and/or when the local disk 118 is accessed. System bus usage actually implemented relative to the SAN and local disk 118 and for LAN travels is modeled in another COGS, i.e., a COGS for transport as further described below. HMI nodes 134 and I/O sensors, communication and storage 136 also are modeled in COGSs other than the server COGS 112.

Figure 4:
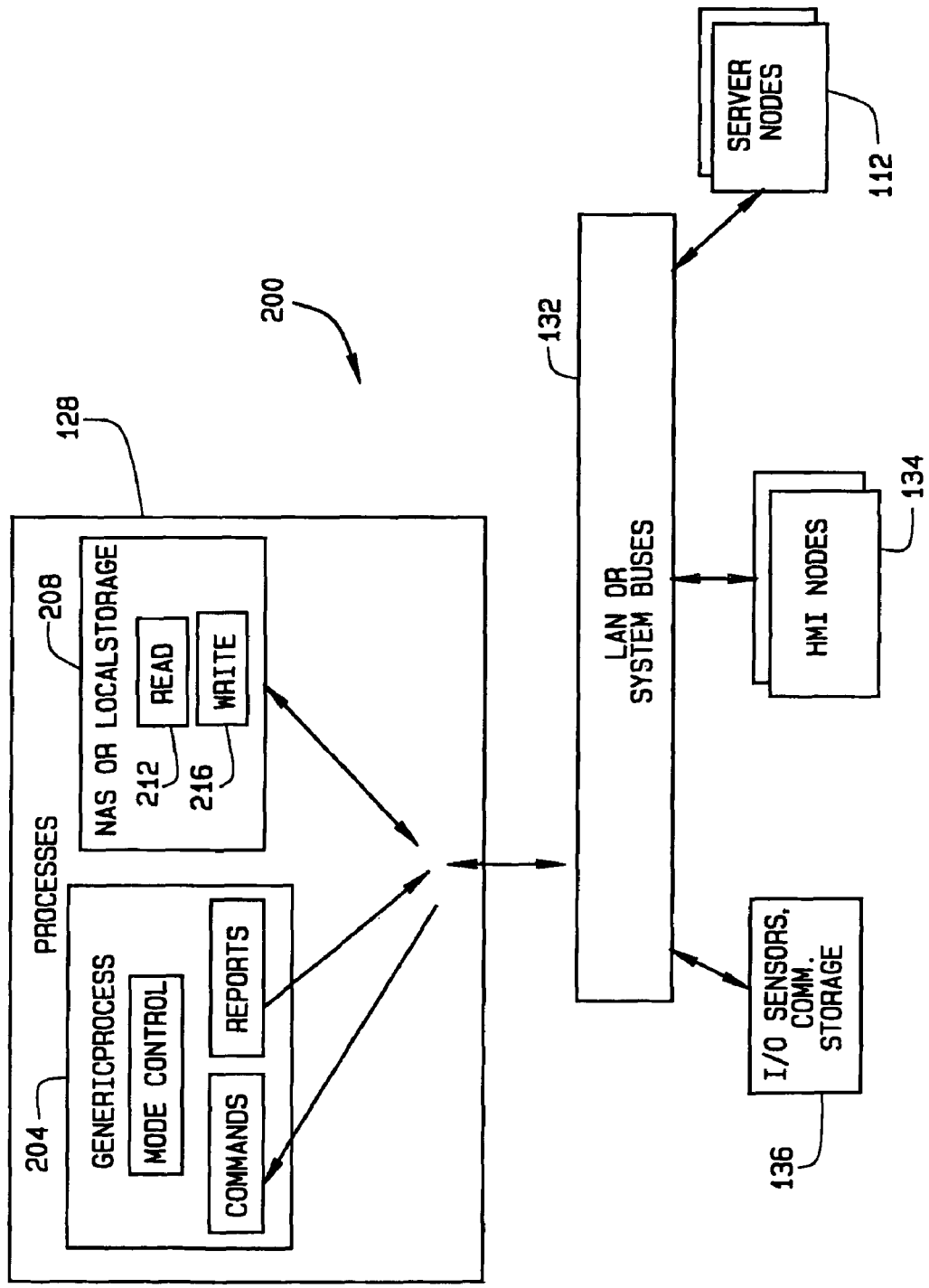
FIG. 4 is a block diagram illustrating how a server process may be modeled as a component of generic structure according to some implementations of the disclosure.

A block diagram illustrating how an exemplary server process may be modeled as a COGS is indicated generally in FIG. 4 by reference number 200. In the present example is modeled a generic process 204 used to sink messages, react to messages, and create messages. The process 204 is modeled to use an appropriate amount of computing resources. A message includes attributes necessary to send the message through a LAN 132 to a destination. Generic processes may be programmed primarily using the processDepl and processNeeds spreadsheets. Generic process models may also include models for translators, generators, routers and sinks. NAS or localStorage 208 may be modeled as a node, with Kbyte bandwidth defined using the spreadsheet resourceCap. Processes "read" 212 and "write" 216 are modeled to utilize bandwidth on a designated node. Generally, generic process models may be replicated and modified as appropriate to build a system model.

Figure 5:
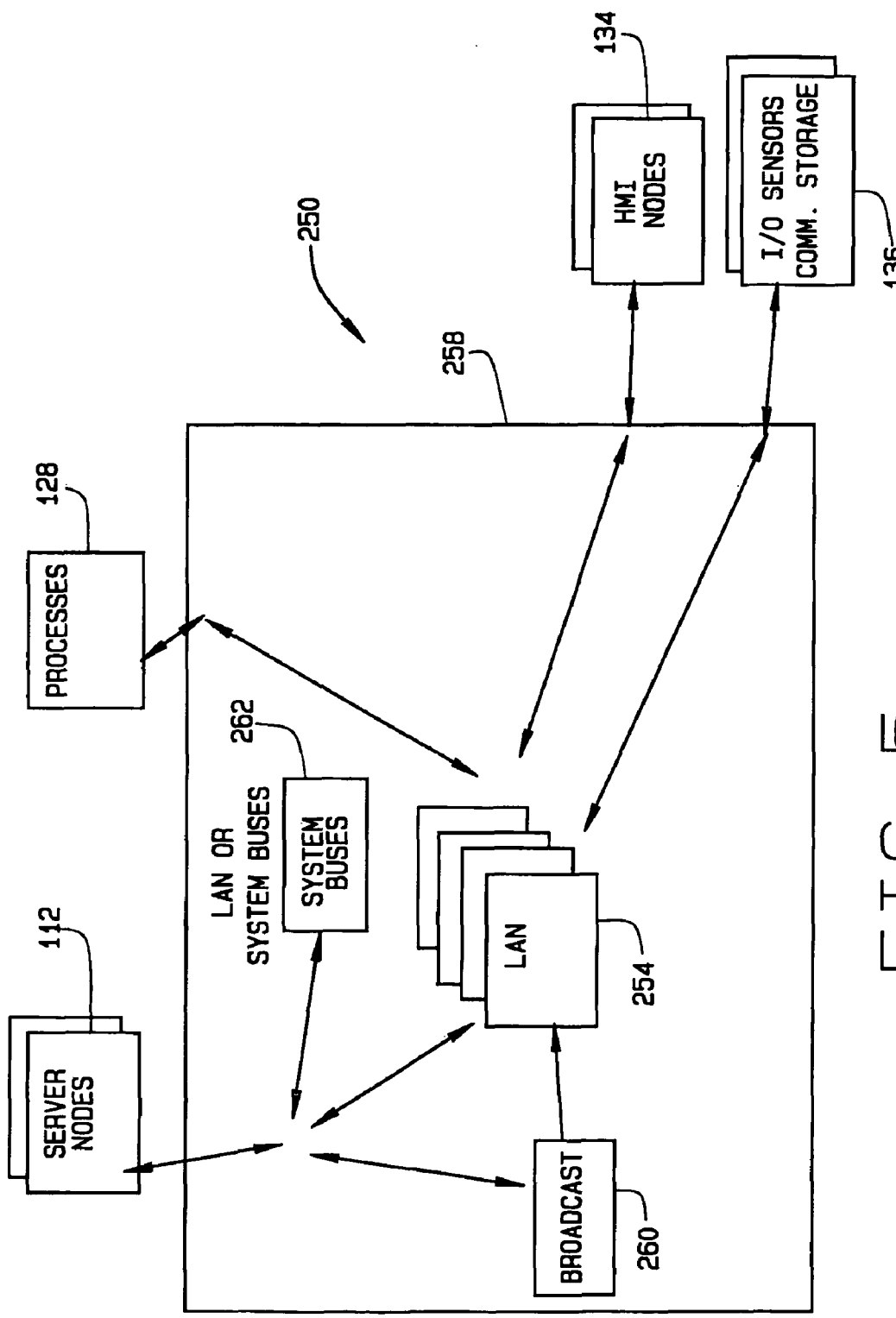
FIG. 5 is a block diagram illustrating how one or more local area networks (LANs) and/or system buses may be modeled as a component of generic structure according to some implementations of the disclosure.

A block diagram illustrating how one or more LANs and/or system buses may be modeled as a transport COGS is indicated generally in FIG. 5 by reference number 250. In the present example, a plurality of LANs 254 are modeled, each having a different Kbytes-per-second bandwidth capacity. A model 258 represents any shared bus and/or any dedicated bus. A model 260 represents broadcast. The model 260 uses broadcast groups, then replicates messages for a single LAN 254 and forwards the messages to the proper LAN 254. The transport COGS 258 implements usage of system buses 262 for server nodes 112 and/or HMI nodes 134. Bus usage is implemented based on destination and source node attributes. The transport COGS also implements LAN 254 usage behavior, such as load balancing across LANs and/or use by a single LAN. After LAN and system bus resources are modeled as having been used, the transport COGS 258 routes messages to appropriate places, e.g., to processes 128, HMI nodes 134 or I/O sensors 136.

In one implementation, to build a model describing a mission system, static models first are created and analyzed. Such models may include models for key system components, deployment architectural views, process and data flow views, key performance and/or other parameters, assumptions, constraints, and system architect inputs. The architectural view, static models, system architect predictions and modeling tools are used to create initial dynamic models. Additional inputs, e.g., from prototypes, tests, vendors, and additional architectural decisions may be used to refine the dynamic models and obtain further inputs to the system architecture. Documentation may be produced that includes a performance and/or other profile, assumptions used in creating the models, static model and associated performance and/or other analysis, dynamic model and associated performance and/or other analysis, risks associated with the system architecture, suggested architectural changes based on the analysis, and suggestions as to how to instrument the mission system to provide "real" inputs to the model.

Figure 6:
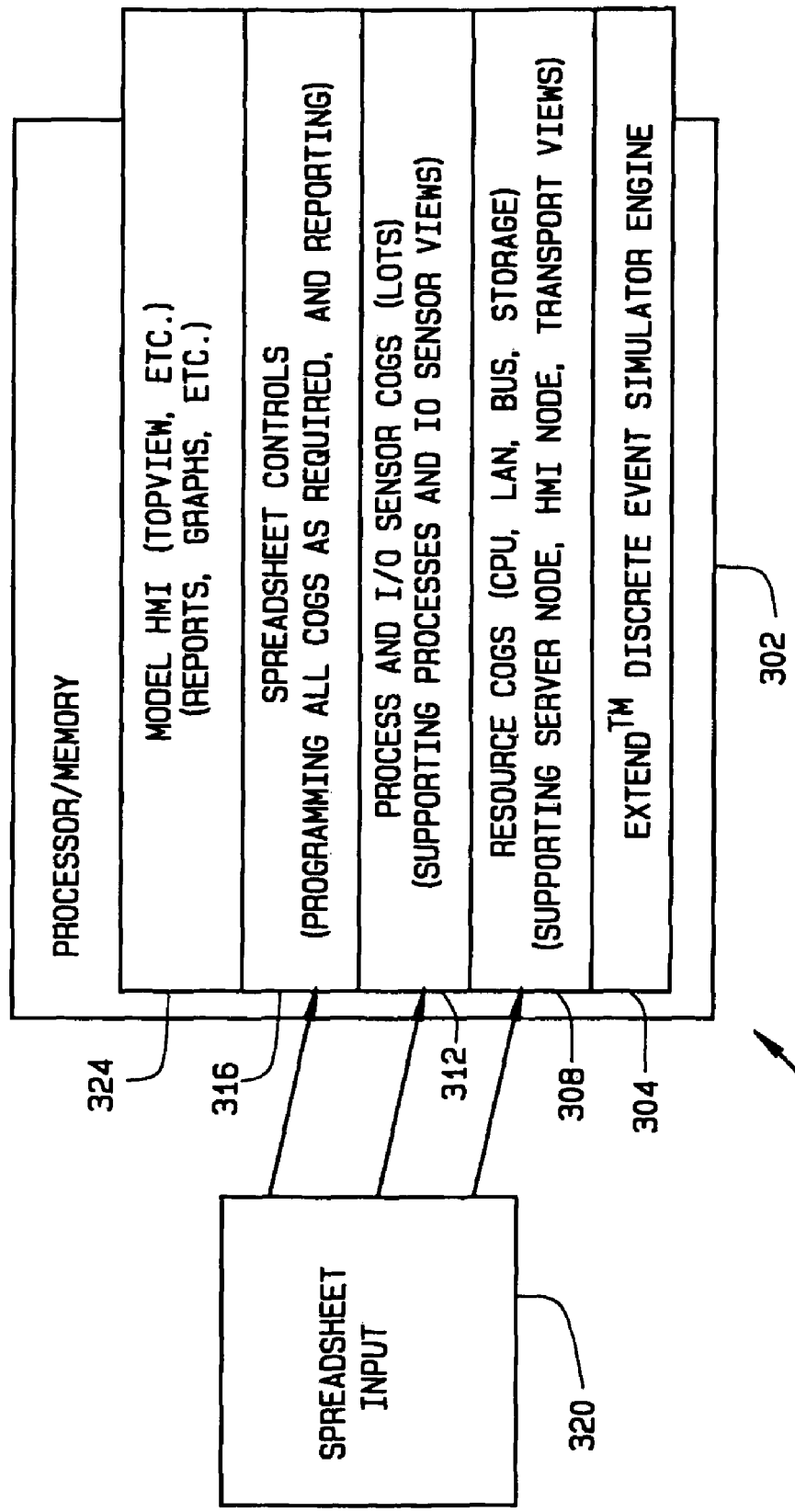
FIG. 6 is a conceptual diagram of dynamic modeling according to some implementations of the disclosure.

A conceptual diagram of one implementation of dynamic modeling is indicated generally in FIG. 6 by reference number 300. The modeling is performed in a computing environment 302 including a processor and memory. An Extend™ discrete event simulator engine 304 is used to perform discrete event simulation of hardware and software under analysis. Reusable resource COGSs 308 and process and I/O sensor COGSs 312 are used to model nodes, networks, buses, processes, communications and sensors. Spreadsheet controls 316 are applied via one or more spreadsheets 320 to the COGSs 308 and 312. A HMI 324 is used to run the model and show reports. Exemplary deployment changes and how they may be performed are shown in Table 2.

TABLE 2

| DEPLOYMENT CHANGE | HOW IT IS DONE |
| --- | --- |
| Change the deployment of a server process from one server node to another. | Change processDepl node cell value in process row. |
| Change the deployment of an HMI process from one node to another. | Change hmiDepl process row from one row to another. Change appropriate node and process id cells. In process model, change appropriate row identifiers to new process row. |

TABLE 2-continued

| DEPLOYMENT CHANGE | HOW IT IS DONE |
| --- | --- |
| Change all server processes to 3 node configuration. | Change all processDepl cells to desired 3 server nodes. |
| Change storage from NAS to SAN. | Change all associated messageDest field from NAS to SAN destination, in inputs to process block. |
| Load balance across multiple networks. | Add appropriate processDepl lines for traffic destination. Change transport view to use these LANS. |
| Change strength of LAN | Change resourceCap spreadsheet, appropriate row and cell to new strength. |

Implementations of the present modeling framework allow component configurations to be modified at runtime. Such configurations can include but are not limited to number of CPUs, strength of CPUs, LAN configuration, LAN utilization, system and I/O buses, graphics configuration, disk bandwidth, I/O configuration, process deployment, thread deployment, message number, size and frequency, and hardware and software component availability. As further described below, system and/or SoS availability can be modeled to predict, for example, server availability and impact on performance, network availability and impact on performance, fault tolerance and how it impacts system function, redundancy and where redundancy is most effective, load balancing, and how loss of load balance impacts system performance. Modeling can be performed that incorporates system latency, and that represents message routing based on a destination process (as opposed to being based on a fixed destination). Impact of a system event on other systems and/or a wide-area network can be analyzed within a single system model environment.

Figure 7:
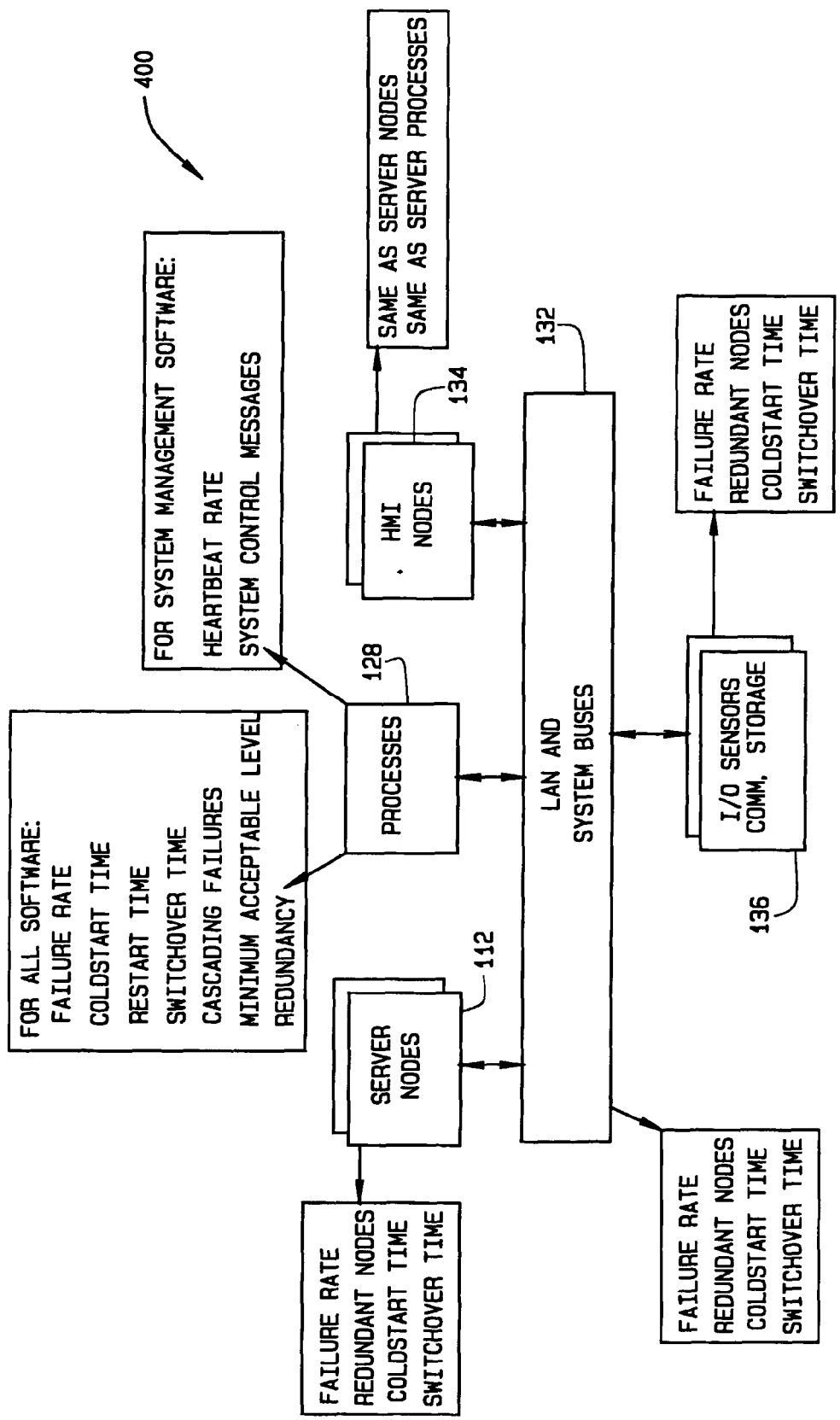
FIG. 7 is a block diagram illustrating how various availability characteristics may be modeled for a system according to some implementations of the disclosure.

Referring again to FIG. 2, in various implementations, predictive availability analysis is performed using the COGSs 54, availability components 68 and availability spreadsheet input. Various availability characteristics may be modeled for a system, for example, as indicated generally in FIG. 7 by reference number 400. Failure rate, redundant nodes, coldstart time and switchover time may be modeled for server nodes 112, LAN and system busses 132, I/O sensors, comm. and storage 136, and HMI nodes 134. For processes 128, failure rate, coldstart time, restart time, switchover time, cascading failures, minimum acceptable level (i.e., a minimum number of components for a system to be considered available) and redundancy are modeled for all software. For system management software, heartbeat rate and system control messages are modeled. Processes of HMI nodes 134 are modeled like processes of server nodes 112.

Exemplary spreadsheet inputs for availability analysis are shown in Table 3. The spreadsheets in Table 3 also may include additional fields and/or uses not described in Table 3. Other or additional spreadsheet inputs also could be used in performing predictive availability analysis. In implementations in which another COTS tool is used, inputs to the COGSs 54 may be in a form different from the present exemplary Extend™ input spreadsheets.

TABLE 3

| Spreadsheet | Use | Component Usage |
| --- | --- | --- |
| Avl-processNeeds | For each component, inputs for component failure rates, transient times, failure algorithm, etc. | Used in hardware availability components and in software availability subcomponents. |
| Avl-heartbeat | For heartbeat control, | Used in heartbeat |

TABLE 3-continued

| Spreadsheet | Use | Component Usage |
|---|---|---|
| | and heartbeat analysis for each component. Plus, control of actual heartbeat generators. | generators and heartbeat analysis components. |
| Avl-redundancy | For mapping of each individual component to other components considered redundant. Also, holds data used in redundancy calculations for availability. | Used in availability analysis components. |
| Avl-cascade | For mapping each component to the components that it can cause failure to, due to its own failure. | Used in availability and cascade analysis components. |
| Avl-control | For system control components, to decide rates, types of messages, routing, etc. | Used in system control components. |

Predictive performance analysis also may optionally be performed in conjunction with availability analysis. In such case, performance components 60 and performance spreadsheet inputs may be optionally included in availability analysis modeling.

Figure 8:
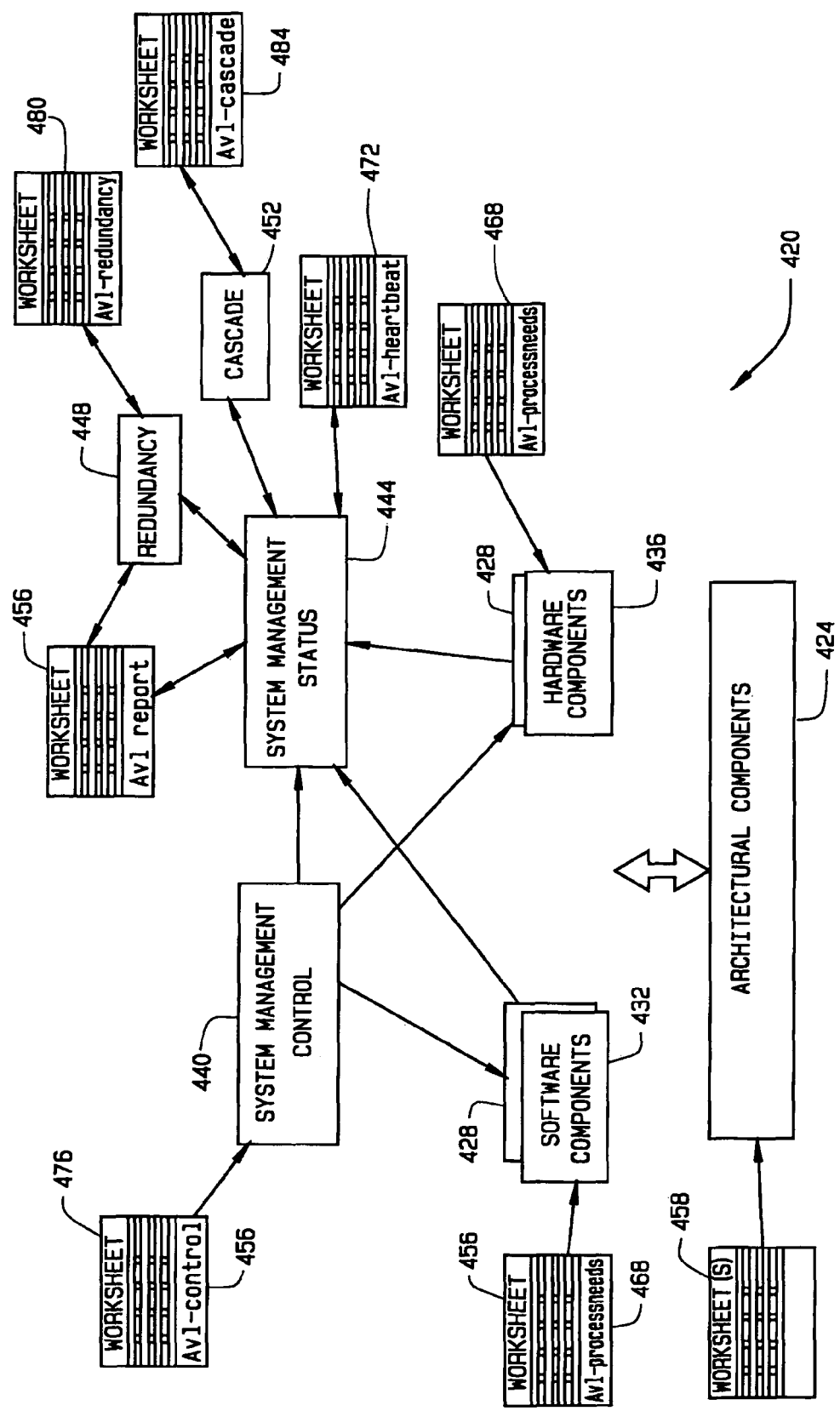
FIG. 8 is a block diagram of a runtime configuration of a system architecture representation according to some implementations of the disclosure.

An exemplary runtime configuration of the architecture representation 50 is indicated schematically in FIG. 8 by reference number 420. Various spreadsheet inputs are shown in FIG. 9. The configuration 420 may be implemented using one or more processors and memories, for example, in a manner the same as or similar to the dynamic modeling shown in FIG. 6. As shown in FIG. 8, runtime architectural components 424 have been configured via availability components 68 for availability analysis. The architectural components 424 also have been configured via performance components 60 (shown in FIG. 2) for performance analysis. The configuration 420 thus may be used for performing availability analysis and/or performance analysis.

The configuration 420 includes a plurality of runtime availability analysis components 428, including software components 432, hardware components 436, system management control components 440, system management status components 444, and redundancy and cascade components 448 and 452. Spreadsheets 456 may be used to configure a plurality of characteristics of the runtime availability analysis components 428. The runtime configuration 420 also includes spreadsheets 458 which include data for use in performing availability analysis, as further described below, and also may include data for performing predictive performance analysis.

Various spreadsheet inputs are indicated generally in FIG. 9 by reference number 460. PlatformRouting spreadsheet 464 points to several other worksheets to configure and control hardware and/or software components that represent the architectural components 424. Avl-processNeeds spreadsheet 468 is used to perform individual component configuration and initial reporting. Avl-Heartbeat spreadsheet 472 provides for heartbeat control and status. Avl-control spreadsheet 746 provides ways to have system management send controls to any component. Avl-redundancy spreadsheet 480 provides lists of components that are redundant to others. Avl-cascade spreadsheet 484 provides lists of components that cascade failures to other components.

The runtime availability analysis components 428 shown in FIG. 8 shall now be described in greater detail. In various implementations of the disclosure, each architectural hardware or software component 424 is associated with a runtime availability hardware or software component 436 or 432. It should be noted that there are various ways in which an architectural component 424 could be associated with a runtime availability component. For example, in some implementations a hardware architectural component 424 is associated with a corresponding platform-routable hardware component 436. In some implementations a software architectural component 424 includes one or more availability software components 432 as subcomponents, as described below. Each hardware availability component 436 and/or software availability component 432 has its own reliability value(s), its own restart time(s), etc. Reliability values and algorithm types that use the reliability values for computation may be spreadsheet-provided as further described below. Typically, a plurality of spreadsheets may be used to configure each component. Routable components 436 are used to represent each piece of hardware. The components 436 may be used to "fail" hardware components 424 based upon failure rate or upon system control. Routable hardware components 436 also are used to control availability of hardware based upon AvailAttr (availability attribute) messages used, for example, to coldstart or switchover a hardware component 424. A capacity multiplier may be used, e.g., set to zero, to fail resources, making them unable to do any requests, so messages queue up.

Hardware Availability Component

Figure 10A:
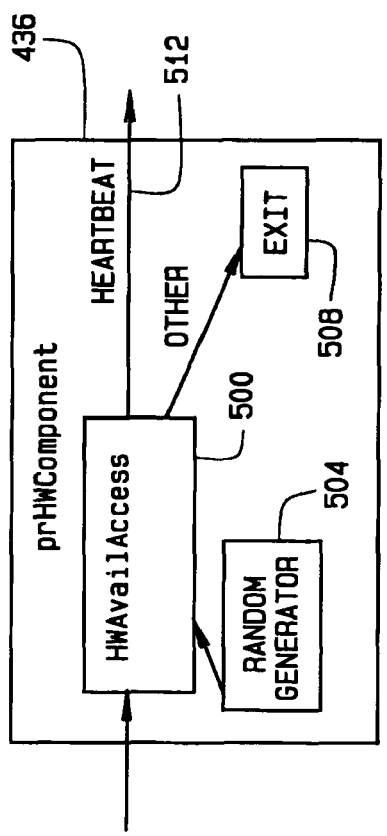
FIG. 10A is a diagram of an availability analysis component representing a hardware component according to some implementations of the disclosure.

One configuration of a platform-routable hardware component 436 is shown in FIG. 10A. During availability analysis, it is assumed that the platform-routable hardware component 436 represents the corresponding architectural hardware component 424. The component 436 includes a HWAvailAccess subcomponent 500, a Random Generator subcomponent 504 and an Exit subcomponent 508. The Random Generator 504 may generate a failure of the component 436 at a random time. In such case, a failure message is generated which fails the component 436 and is routed to the Exit subcomponent 508.

Figure 10B:
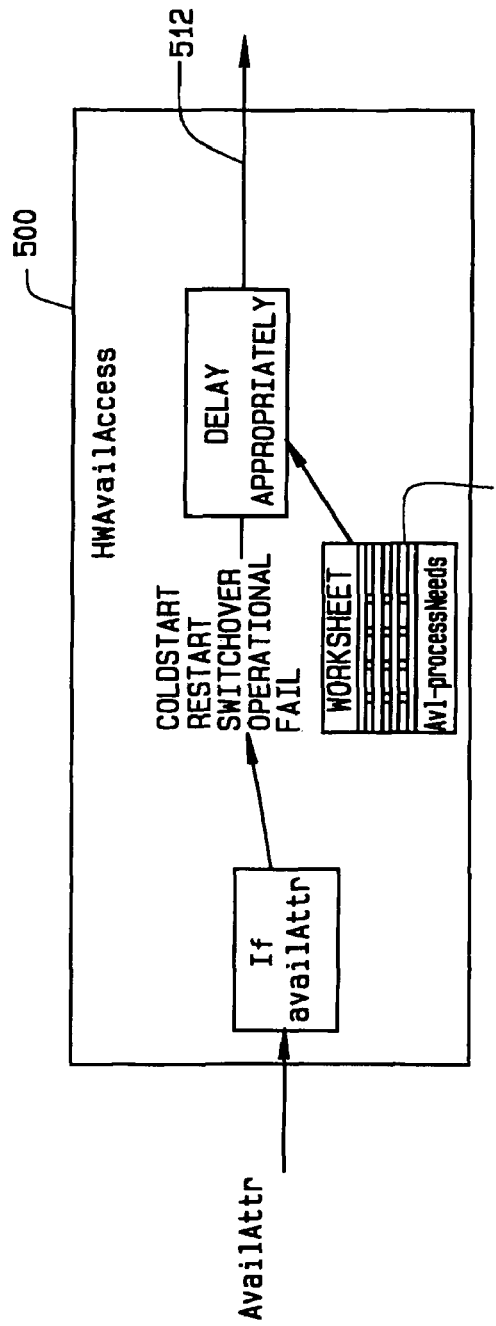
FIG. 10B is a diagram of a subcomponent of the component shown in FIG. 10A.

The HWAvailAccess subcomponent 500 is shown in greater detail in FIG. 10B. The subcomponent 500 queues up a heartbeat signal 512 to a processor architectural component 428 to get processed, by priority, like most other processes. The routable component 436 returns a heartbeat to a final destination using a routeOutputs subcomponent, further described below.

Each routable hardware component 436 corresponds to a line in a processNeeds spreadsheet (shown in Table 1) and a line in a PlatformRouting spreadsheet 464.

Another spreadsheet, Avl-processNeeds, is used to provide input parameters to the model for use in performing various failure algorithms. By varying data in the Avl-processNeeds spreadsheet, a system user can vary statistical failure rates, e.g., normal distributions, and calculation input parameters used by the model. The Avl-processNeeds spreadsheet provides failure times and a probability distribution. A TimeV1 field is used to provide a mean, and a field TimeV2 is used to provide a standard deviation, for hardware failure. The Avl-processNeeds spreadsheet is the same as or similar in form to the processNeeds spreadsheet. The Avl-processNeeds spreadsheet provides the following parameters. If a routable component 436 is to be monitored for availability, then an "on/off" field is set to "on". If the routable component 436 "on/off" field is "on", then a value "available" equals 1 or 0. if the component 436 "on/off" field is "off", "available" equals 1. "On" and "off" are provided for allowing a component to fail. Coldstart, restart, switchover and isolation times are also provided by the Avl-processNeeds spreadsheet.

A mechanism is provided to fail hardware and all software components deployed on that hardware. For example, if a routable hardware component 436 fails, it writes to capacity-Multiplier in the resourceCap spreadsheet, setting it to 0. When "unfailed", it writes capacityMultiplier back to 1. The "available" field for that component is also set. If, e.g., a coldstart or restart message is received, the hardware component 436 sets capacityMultiplier to 0, waits for a time indicated on input spreadsheet avl-processNeeds 468, resets capacityMultiplier to 1, and sinks the message. The "available" field for that component 436 is also set.

A mechanism is provided to restore a hardware component and all software components deployed on that hardware component. For example, when a routable hardware component 436 restarts itself, the HWavailAccess subcomponent generates a restart message, sets "available" to 0 and delays for a restartTime (included in the Avl-processNeeds spreadsheet 468) so that no more messages go through the component 436. The restart message causes all messages to be held for the spreadsheet time, while messages to that component, which typically are heartbeat messages, start backing up. Then the component 436 sets "available" back to 1 and terminates the delay, making the component 436 again available. The messages queued up then flow through the system.

Component failure may be detected in at least two ways, e.g., via heartbeatAnalyzer and/or availabilityAnalyzer. components. HeartbeatAnalyzer uses lack of heartbeat message in determining if too long a time has passed since the last heartbeat. It is also detected by availabilityAnalyzer via the avl-processNeeds worksheet. Two values are provided: actual available time, and time that the system knows via heartbeat that the component 436 is unavailable.

AvailabilityAnalyzer periodically goes through the avl-processNeeds spreadsheet and populates a componentAvailability column with cumulative availability for each component. If a component is required and unavailable, AvailabilityAnalyzer marks the system as unavailable.

Software Availability Component

One configuration of a software availability component 432 is indicated generally in FIG. 11. An AvailAccess component 600 is included as a subcomponent of the corresponding software process architectural component 424. The subcomponent 600 corresponds to a line in the processNeeds spreadsheet and also corresponds to a line in the Platform-Routing spreadsheet 464. The subcomponent 600 includes a Random Generator component 604.

If availAttr is set in a message 608 and the signaled attribute is "coldstart", "restart", etc., then: (a) an "available" field for the process is set to zero; (b) time and delays are selected; (c) any additional messages are queued; (d) when time expires, the "available" field is set to 1; and (e) all message are allowed to flow again. If the signaled attribute is "heartbeat", CPUCost is set appropriately, the heartbeat is sent on and routed to its final destination, i.e., a heartbeat receiver component further described below. If availAttr not set in the message 608, the message is assumed to have been generated, for example, by performance analysis components. Accordingly, the message is sent through (and queues if a receiving software component is down.)

A second availability subcomponent 612, routeOutputs, of the corresponding software process architectural component 424 routes a heartbeat signal 616 to a final destination, i.e., a heartbeat receiver component further described below. As previously mentioned, a routeOutputs subcomponent is also included in hardware availability components 436, for which it performs the same or a similar function. If availType equals "heartbeat", the RouteOutputs subcomponent 612 overrides the route to the final destination, i.e., a heartbeat receiver component further described below.

Avl-processNeeds Spreadsheet

The Avl-processNeeds spreadsheet Avl-processNeeds, is used to provide input parameters to the model for use in performing various software failure algorithms. By varying data in the Avl-processNeeds spreadsheet, a system user can vary statistical failure rates, e.g., normal distributions, and calculation input parameters used by the model. The Avl-processNeeds includes the same or similar fields as the processNeeds spreadsheet and may use the same names for components. The Avl-processNeeds spreadsheet can provide failure times and distribution (TimeV1, TimeV2, Distribution fields) for a component self-generated random failure. These fields can be used for time-related failure or failure by number of messages or by number of bytes. The Avl-processNeeds also provides as follows.

An "On/off" field is provided for allowing a component to fail and is set at the beginning of a model run. An "available" field is set during a model run. If "on" is set, a component is monitored for availability. If "off" is set, a component is not monitored. A "required" field may be used to indicate whether the component is required by the system. Avl-processNeeds may provide coldstart time, restart time, switchover time and/or isolation time. The foregoing times are used when the corresponding types of failures occur. The times are wait times before a component is restored from a fail condition. A cumulative availability field is used to hold a cumulative time that a component was available for the run. This field may be filled in by the availabilityAnalyzer component.

If a software component fails (through coldstart, restart, etc.), the component sets the "available" field to 0, waits an appropriate time, then sets the "available" field to 1.

When a software component coldstarts itself, the availAccess subcomponent generates a "coldstart" message, sets the "available" field in the component to 0, and delays coldstart-Time so that no more messages go through. The coldstart message holds all messages for a spreadsheet time while messages to that component start backing up. Then the availAccess subcomponent sets "available" back to 1 and ends the delay, making the component again available. The messages queued up then can flow through the system, typically yielding an overload condition until worked off.

A software component failure may be detected in at least two ways, e.g., by heartbeatAnalyzer and by availabilityAnalyzer, in the same or similar manner as in hardware component failures as previously described. It should be noted that a software component failure has no direct effect on other software or hardware components. Any downstream components would be only indirectly affected, since they would not receive their messages until coldstart is over. Note that a component also could be coldstarted from an external source, e.g., system control, and the same mechanisms would be used.

System Management Control Components

Control components 440 may be used to impose coldstart, restarts, etc. on individual part(s) of the system. Various system management control components 440 are shown in greater detail in FIG. 12. A prControl component 700 uses input from the Avl-control spreadsheet 476 to generate a control message toward a single hardware or software component 428. Attributes of a prControl component 700 include creation time and availType=control. A hardware or software component 436 or 432 receiving a control message checks whether availType=coldstart, restart, switchover, etc. and may delay accordingly. An exit component 438 is used for completed messages.

System Management Status Components

Figure 13:
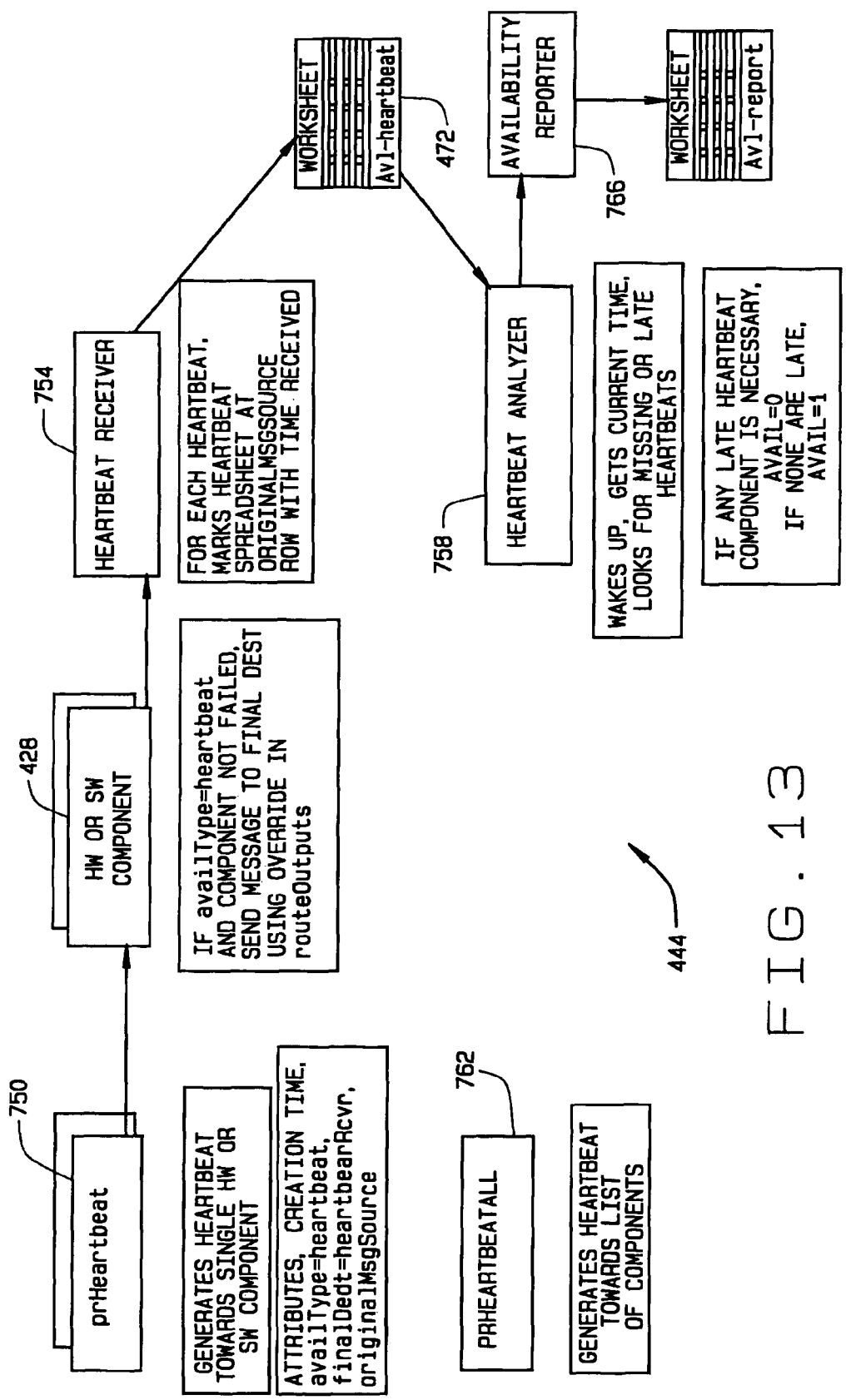
FIG. 13 is a diagram of system management status components according to some implementations of the disclosure.

Various system management status components 444 are shown in greater detail in FIG. 13. A prHeartbeat component 750 sets availAttr to "heartbeat" and sets finalMsgDest to heartbeatAnalyzer. A component prHeartbeatRcvr 754 receives heartbeats from anywhere in the system. The component 754 uses an originalmsgSource field in the avl-heartbeat spreadsheet 472 as the identifier of a spreadsheet row that sent a heartbeat and fills in a heartbeat receive time in the avl-heartbeat spreadsheet 472. A prHeartbeatAnalyzer component 758 wakes up in accordance with a cyclic rate in the prProcessNeeds spreadsheet 468. The component 758 gets the current time, analyzes the avl-heartbeat spreadsheet 472 for missing and/or late heartbeats, and fills in a "heartbeat-failed" field if a component is "on" and "required" and a time threshold has passed. An availability reporter component 766 uses results of the prHeartbeatAnalyzer component 758 to report on overall system availability. A component prHeartbeatAll 762 generates heartbeats towards a list of hardware or software components 436 or 432.

The avl-heartbeat spreadsheet 472 operates in the same or a similar manner as the processNeeds spreadsheet and uses the same names for components. Fields of the spreadsheet 472 may be used to manipulate availability characteristics of component(s) and also may be used to calculate heartbeat-determined failures. "On/off" is set for a hardware or software component 436 or 432 in the avl-heartbeat spreadsheet 472 at the beginning of a model run. If "on", the component is monitored for heartbeat. If "off", the component is not monitored. "Required" is set for a hardware or software component 436 or 432 in the avl-heartbeat spreadsheet 472 at the beginning of a model run. If "required" is "0", the component is not required. If "required" is "1", the component is required. If "required" is "2", additional algorithms are needed to determine whether the component is required. A heartbeat failure time "failureThreshold" in the avl-heartbeat spreadsheet 472 provides a threshold for determining heartbeat failure and provides individual component control. A heartbeat receive time "receiveTime" in the avl-heartbeat spreadsheet 472 is set for a hardware or software component during a model run. The heartbeat receive time is set to a last time a heartbeat was received for that component. A "heartbeat failed" field is set to "0" if there are no heartbeat failures or to "1" if a heartbeat failure occurs. A heartbeat failure is determined to have occurred when:

currentTime−receiveTime>failureThreshold

A software or hardware component failure may be detected in the following manner. Heartbeat messages may be generated by prHeartbeatAll 762 and may be sent to ranges of components. A failed component queues its heartbeat message. The component prHeartbeatAnalyzer 758 wakes up periodically, looks at current time, on/off, required, heartbeat failure time and heartbeat receive time to determine whether the component being analyzed has passed its time threshold. The component prHeartbeatAnalyzer 758 writes its result to the availability reporter component 766. Such result(s) may include accumulation(s) of availability by heartbeat. It should be noted that components which are not marked "required" have no affect on overall system availability.

Redundancy Management

Figure 14:
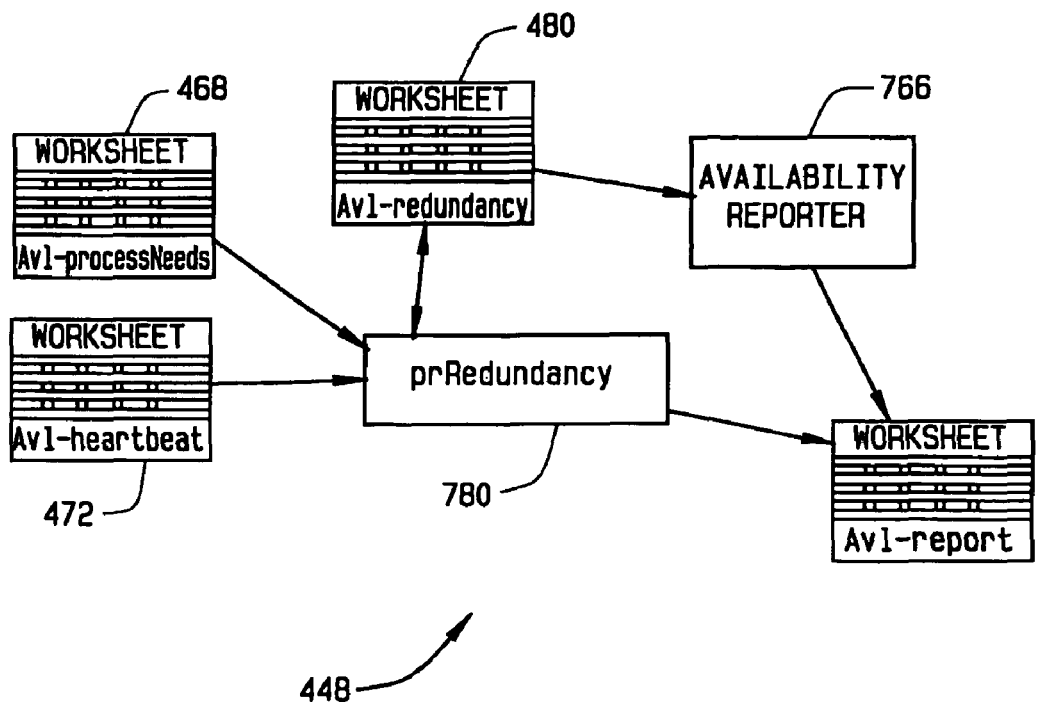
FIG. 14 is a diagram of redundancy components according to some implementations of the disclosure.

Various redundancy components 448 are shown in greater detail in FIG. 14. Redundancy can come into play when a fault occurs or is detected. In such event, a conclusion that a component has failed and/or the system is not available is postponed and a prRedundancy component 780 is executed. The prRedundancy component 780 may use one or more lists of redundant components and current availability of each of those components to determine an end-result availability. Lists of redundant components are configurable to trade off redundancy decisions. The availability reporter component 766 uses results of prRedundancy 780 to report on overall system availability.

Cascade

Figure 15:
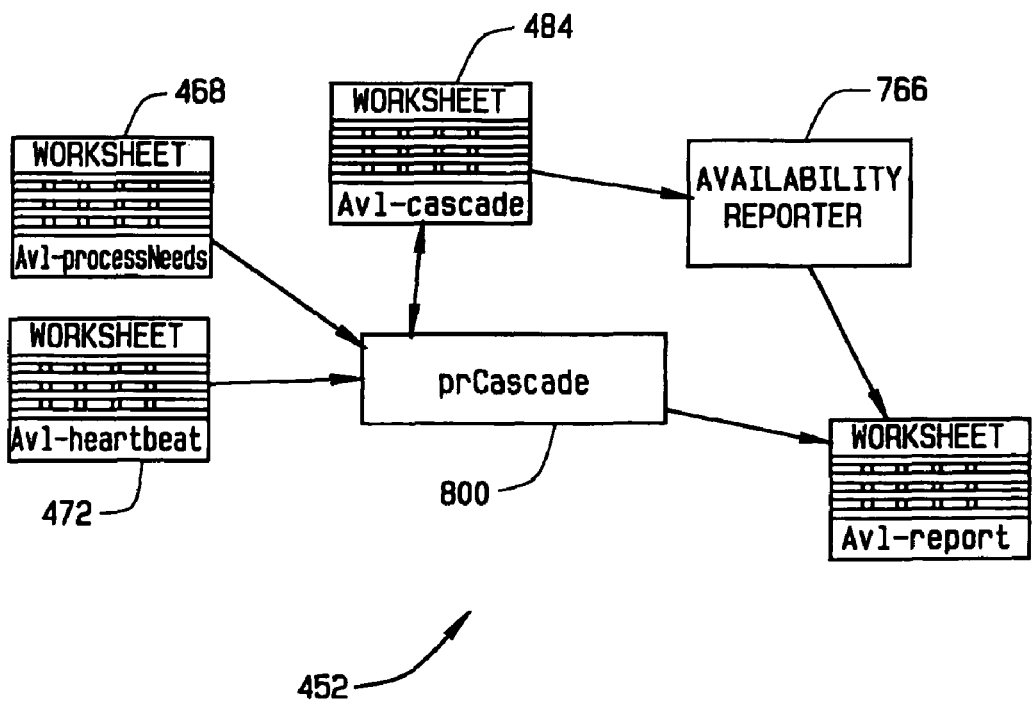
FIG. 15 is a diagram of cascade components according to some implementations of the disclosure.

Various cascade components 452 are shown in greater detail in FIG. 15. Cascading failures can come into play when a fault occurs or is detected. In such event, a conclusion that a component has failed and/or the system is not available is postponed and a prCascade component 800 is executed. The prCascade component 800 assesses availability using current component availability and one or more lists of cascading relationships between or among components. The prCascade component 800 uses one or more lists of cascaded failures and fails other components due to the cascading. Lists of cascading components are configurable to trade off cascading decisions. The availability reporter 766 uses results of prCascade 800 to report on overall system availability.

Various functions that may be implemented using various models of the present disclosure are described in Table 4.

TABLE 4

| Functions | How Performed |
| --- | --- |
| Provide the quantitative availability prediction for the system under analysis. | Available when heartbeat says it is, minus a small amount of time allocated to heartbeat cycle time. Total time is the time of the simulation. Available time is from heartbeat analyzer or availability analyzer. |
| Provide quantitative predictions of downtime as a result of a variety of failures (hardware, software, system management). | Downtime starts at component failure, using a time tag. Downtime ends when the heartbeat message from that component is returned. Also may perform static analysis using the spreadsheet. |
| Provide a means to tradeoff hardware availability decisions such as redundancy, load balancing | Load balancing can be turned on or off for tradeoff analysis. When on, availability does not get affected by redundant component. When off, downtime may exist. |
| Provide a means to trade off software component management and decisions against program needs (such as amount of redundancy, use of checkpoint, bundling, priorities, QoS, etc). | Can turn on/off checkpoint, along with coldstart and restart capability to tradeoff timelines with and without. Plus, can tradeoff in presence of performance considerations. Can bundle software together, such that larger bundles have larger failure rates, perhaps affecting overall system availability. Can bust apart critical and non-critical functions. Can change deployment options. |
| Provide a means to trade off system management decisions against program needs (such as use of clustering, period of heartbeat, prioritization, QoS and others). | Can change period of heartbeat, change deployment of software to cluster node after failure, change restart policy, change deployment options. |
| Provide quantitative predictions of times and timelines for hardware/software fault detection and reconfiguration. | Heartbeat and failure mechanism provide times for individual component detection and reconfiguration. Sum of times, plus message transmission, plus resource contention, plus performance data in the way, provide timelines. |

TABLE 4-continued

| Functions | How Performed |
|---|---|
| Provide startup time prediction | Start system with hardware coldstart messages, then software coldstart messages, in sequence. |
| Provide a means to do the analysis in the presence of performance and operational data, or without these data types. | Use availability components in addition to performance components. Have both components compete for resources. |
| Provide a means to drive availability requirements down to software component(s). | Do analysis with model to determine combinations of software reliability that yields required availability. Allocate resultant software reliability numbers down to groups of components. |

Various scenarios that may be implemented using various models of the present disclosure are described in Table 5.

TABLE 5

| Scenarios | How Performed |
|---|---|
| Random hardware failure is detected, messages stop flowing and system is deemed unavailable until MTTR time is over. | Model fails node using random rate. System management heartbeat detects the failure, and coldstarts node. Latency and availability are measured. Routable hardware component to represent each hardware resource, each one tied to avl-processNeeds spreadsheet. Random generator sets capacity multiplier to 0. Messages that need resource pile up. Heartbeat analyzer and availability analyzer cumulate failure time. |
| Random software failure is detected, then software component cold started. System is unavailable for detect + coldstart time + messaging time. | Model fails software component. System management heartbeat detects the failure, and coldstarts (or restarts if checkpointed) process. Latency and availability are measured Software availability component goes in front of all software components in useS10Resources and uses avl-processNeeds spreadsheet for configuration. Random fail the resource just stops all messages from leaving availability components for the coldstart, restart or switchover time. |
| System control forced hardware or software failure or state change, then component changes state. Detection and availability as above. | Routable system control component wakes up, sends fail, or coldstart, or other message to hardware or software routable component. Receiving component changes state, changes availability state, analyzers cumulate down time. |
| System control forces a list of hardware/software to fail, coldstart, etc, then list of components change state. | Routable system control component wakes up, sends fail or coldstart or other to list of components. List of destinations in avl-forward spreadsheet. Each receiving component behaves as previous row. |
| Cascading software failures result in changed availability. Such as, one component fails, requiring numerous components to be restarted. Detection, availability as above. | Fault tree containing necessary components for the system to be considered available. Or perhaps, list containing those that can fail and still have the system available. |
| One of the redundant hardware components fails, the system remains available. | Availability analysis component uses available result worksheet, including avl-redundancy and deems the system available. Analysis also shows time that system is available without the redundancy. |

In some implementations, static analysis of availability can be performed in which input spreadsheets are used to approximate availability of a system. Reliability values for hardware and software components may be added to obtain overall reliability value(s). For each of any transient failure(s), value(s) representing probability*(detection time+reconfiguration time) may be combined to obtain an average downtime. Software reliability value(s) may be adjusted accordingly.

In contrast to existing predictive systems and methods, the foregoing system and methods use a model of the hardware and software architecture. Thus the foregoing systems and methods are in contrast to existing software availability predictive methods which are not performed in the context of any specific hardware mission system configuration. None of the existing software availability predictive tools or methods directly address software-intensive mission systems, nor do they provide easy trade-off mechanisms between fault detection, redundancy and other architectural mechanisms.

Implementations in accordance with the present disclosure can provide configurability and support for many programs and domains with common components. It can be possible to easily perform a large number of "what if" analyses. Redundancy, system management, varied reliability, and other system characteristics can be modeled. Because implementations of the foregoing modeling methods make it possible to quickly perform initial analysis, modeling can be less costly than when current methods are used. Ready-made model components can be available to address various types of systems and problems. Various implementations of the foregoing modeling methods make it possible to optimize availability designs and to justify availability decisions. Availability analysis modeling can be performed standalone or in the presence of performance data and analysis.

Various implementations of the present disclosure provide mathematically correct, provable and traceable results and can be integrated with other tools and/or techniques. Other tools and/or techniques can be allowed to provide inputs for analyzing hardware or software component reliability. Various aspects of availability can be modeled. Standalone availability analysis (i.e., with no other data in a system) can be performed for hardware and/or software. Hardware-only availability and software-only availability can be modeled. Various implementations allow tradeoff analysis to be performed for hardware/software component reliability and for system management designs. In various implementations, a core tool with platform-routable components is provided that can be used to obtain a very quick analysis of whole system availability and very quick "what if" analysis.

Apparatus of the present disclosure can be used to provide "top down" reliability allocation to hardware and software components to achieve system availability. Additionally, "bottom up" analysis using hardware/software components and system management designs can be performed, yielding overall system availability. Individual software component failure rates based upon time, or size or number of messages can be analyzed. Software failures based upon predictions or empirical data, variable software transient failure times also can be analyzed. Various implementations provide for availability analysis with transient firmware failures and analysis of queueing with effects during and after transient failures.

Cascade analysis can be performed in which cascade failures and their effect on availability, and cascade failure limiters and their effects on availability, may be analyzed. Availability using hardware and/or software redundancy also may be analyzed. Analysis of aspects of system management, e.g., variable system status techniques, rates, and side effects also may be performed.

Implementations of the disclosure may be used to quantitatively predict availability of systems and subsystems in the presence of many unknowns, e.g., hardware failures, software failures, variable hardware and software system management architectures and varied redundancy. Various implementations make it possible to quantitatively predict fault detection, fault isolation and reconfiguration characteristics and timelines.

A ready-made discrete event simulation model can be provided that produces quick, reliable results to the foregoing types of problems. Results can be obtained on overall system availability, and length of downtime predictions in the presence of different types of failures. Using models of the present disclosure, virtually any software/system architect can assess and tradeoff the above characteristics. Such analysis, if desired, can be performed in the presence of performance analysis data and performance model competition for system resources. Numerous components, types of systems, platforms, and systems of systems can be supported. When both performance analysis and availability analysis are being performed together, performance analysis components can affect availability analysis components, and availability analysis components can affect performance analysis components.

A repeatable process is provided that may be used to better understand transient failures and their effect on availability and to assess availability quantitatively. Software component failures may be accounted for in the presence of the mission system components. Availability analysis can be performed in which hardware and/or software components of the mission system are depicted as individual, yet interdependent runtime components. In various implementations of apparatus for predictively analyzing mission system availability, trade-off mechanisms are included for fault detection, fault isolation and reconfiguration characteristics for mission systems that may be software-intensive.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method of assessing behavioral aspects of one or more mission systems, the method performed by a processor configured with memory, the method comprising:
   providing to a user a plurality of architectural components each generically representing a hardware or software system element includable in a model of a mission system;
   based on input from the user to a runtime environment of the processor, combining instances of the architectural components to represent hardware components and software components in a mission system model and mapping the software components to the hardware components to indicate deployment of the software components on the hardware components, to enable execution of the mission system model;
   based on the user input, specifying one or more amounts of resources of the hardware components needed by one of the software components and associating the one or more amounts with the one of the software components to enable execution of the mission system model;
   based on the user input, associating at least some of the architectural components with runtime availability analysis components for receiving and responding to availability attribute messages in the runtime environment;
   based on the user input, associating availability characteristics with one of the at least some of the architectural components;
   dynamically modeling system availability, the modeling performed by sending an availability attribute message input by the user to an availability analysis component associated with one of the architectural components and monitoring behavior of at least one of the hardware or the software component of the at least some of the architectural components in response to the message;
   dynamically indicating availability of the mission system model to the user based on the behavior;
   wherein the availability characteristics for a software component comprise at least one of failure rate, coldstart time, restart time, redundancy, cascading failures, minimum acceptable level, and switchover time; and
   wherein the availability attribute message indicates one of the following: coldstart, restart, switchover, operational, and fail.

2. The method of claim 1, wherein the architectural components include at least one transport component.

3. The method of claim 1, wherein dynamically modeling system availability comprises performing discrete event simulation using the inputs.

4. The method of claim 1 further comprising:
   receiving one or more availability characteristics from the user in one or more spreadsheets.

5. The method of claim 4, wherein the spreadsheets indicate that one or more of the architectural components is not to be monitored for availability.

6. An apparatus for analyzing availability in one or more mission systems, the apparatus comprising at least one processor and at least one memory configured to:
   make available to a user a plurality of architectural components each generically representing a hardware or software system element includable in a model of a mission system;
   based on input from the user to a runtime environment of the processor, combine instances of the architectural components to represent hardware components and software components in the mission system model and map the software components to the hardware components to indicate deployment of the software components on the hardware components, to enable execution of the mission system model;
   based on the user input, specify amounts of resources of the hardware components needed by the software components and associate the amounts with the software components as needed to execute the mission system model;
   based on the user input, associate the at least some of the architectural components with runtime availability analysis components for receiving and responding to availability attribute messages in the runtime environment;
   simulate system availability, the simulating including sending an availability attribute message input by the user to an availability analysis component associated with one of the architectural components and monitoring behavior of at least one of the hardware components or one of the software components of the at least some of the architectural components in response to the message;
   dynamically indicate system availability of the mission system model to the user based on the behavior;
   wherein the at least one processor and at least one memory are further configured to associate with a software component at least one of the following availability characteristics: failure rate, coldstart time, restart time, redundancy, cascading failures, minimum acceptable level, and switchover time; and wherein the availability attribute message indicates one of the following: coldstart, restart, switchover, operational, and fail.

7. The apparatus of claim 6, wherein the at least one processor and at least one memory are further configured to execute one or more system management status components of the model to generate and monitor a heartbeat for at least some of the architectural components.

8. The apparatus of claim 6, wherein the apparatus is further configured to receive at least one spreadsheet input to the model.

9. The apparatus of claim 6, wherein the at least one processor and memory are further configured to selectively apply software component reliability algorithms and calculation input parameters to model one or more software components; and
   assess an impact, if any, of the one or more modeled software components on overall reliability of the mission system.

10. The apparatus of claim 6, wherein the at least one processor and memory are further configured to select a reliability rate calculation for a component.

11. The apparatus of claim 10, wherein the at least one processor and memory are further configured to select a statistical rate calculation for a component.

12. The apparatus of claim 10, wherein the at least one processor and memory are further configured to vary a selected statistical rate calculation for a component.

13. A method of assessing availability in one or more mission systems, the method performed by a processor configured with memory, the method comprising:
   providing to a user a plurality of architectural components each generically representing a system element includable in a model of a mission system, the elements including hardware and software elements;
   based on input from the user to a runtime environment of the processor, combining instances of the architectural components to represent hardware components and software components in a mission system model and mapping the software components to the hardware components to indicate deployment of the software components on the hardware components, to enable execution of the mission system model;
   based on the user input, specifying one or more amounts of resources of the hardware components needed by one of the software components and associating the one or more amounts with the one of the software components, as needed to execute the mission system model;
   based on the user input, associating the at least some of the architectural components with runtime analysis components configured to receive and respond to heartbeat messages and availability attribute messages in the runtime environment;
   wherein the based on the user input, associating availability characteristics for the one of the software components, and wherein the availability characteristics comprise at least one of: failure rate, coldstart time, restart time, redundancy, cascading failures, minimum acceptable level, and switchover time;
   dynamically modeling system availability, the modeling performed by sending one or more messages input by the user to a runtime analysis component associated with one of the architectural components and monitoring behavior of the at least some of the architectural components in response to the message;
   dynamically indicating availability of the mission system model to the user based on the behavior;
   wherein the availability attribute message indicates one of the following: coldstart, restart, switchover, operational, and fail.

14. The method of claim 13, the processor configured to generate a heartbeat for each architectural component indicated as not having failed, the method further comprising issuing a report to the user as to the heartbeats.

15. The method of claim 13, further comprising performing availability analysis and performance analysis in the same configuration of the runtime environment.

* * * * *